United States Patent Office 3,111,996
Patented Nov. 26, 1963

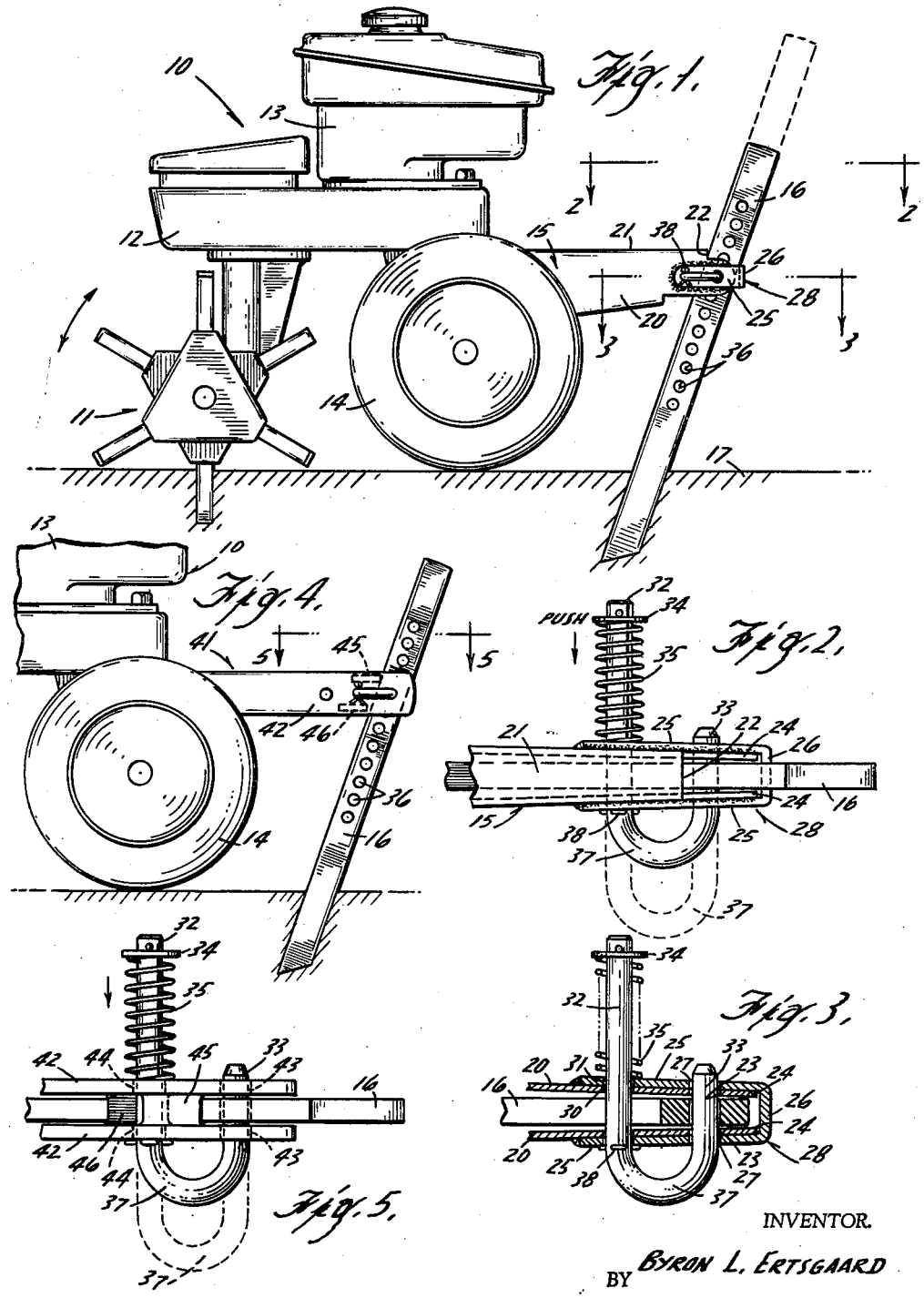

3,111,996
QUICKLY ADJUSTABLE DRAG STAKE FOR A ROTARY TILLER
Byron L. Ertsgaard, Sheboygan, Wis., assignor to Gilson Bros. Co., Plymouth, Wis., a corporation of Wisconsin
Filed July 13, 1961, Ser. No. 123,842
4 Claims. (Cl. 172—42)

This invention relates to a quickly adjustable drag stake for a rotary tiller.

According to the present invention, the drag stake of a rotary tiller can be quickly adjusted for proper depth penetration into the soil simply by the manual manipulation of a spring-biased pin which cooperates with the drag stake to normally hold it in any selected adjusted position. Heretofore it has been necessary to remove a cotter pin or the like from the drag stake fastening pin in order to effectuate the adjustment thereof. Accordingly, prior art devices were not readily adapted to quick adjustments of the drag stake to accommodate for different soil conditions or to shift the drag stake to an out-of-the-way position when the tiller is to be transported on its wheels over hard pavement and the like.

The embodiments of the invention herein disclosed for exemplification relate to reversible tillers which will cultivate the soil both when moving forwardly and when moving in reverse. The spring-biased retractible drag stake locking pin herein disclosed is combined with fore and aft stops which prevent collapse of the drag stake, regardless of the direction in which the tiller is moving.

Other objects, advantages and features of the invention will appear from the following disclosure in which:

FIG. 1 is a side elevation of a tiller embodying the invention.

FIG. 2 is a fragmentary plan of the tail piece, viewed on the line 2—2 of FIG. 1.

FIG. 3 is a fragmentary cross section taken along the line 3—3 of FIG. 1.

FIG. 4 is a fragmentary side elevation of a modified embodiment of the invention.

FIG. 5 is a fragmentary plan of the tail piece, viewed on the line 5—5 of FIG. 4.

The rotary tiller 10 is of generally conventional construction and need not be described in detail. It consists generally of a rotary tilling mill 11 connected through transmission elements in the frame housing 12 to an engine 13, the whole being supported primarily on wheels 14. In the disclosed embodiments, the transmission within the housing 12 is reversible to selectively drive the tilling mill 11 either forwardly or rearwardly at the option of the operator.

Projecting rearwardly from the tiller frame 12 and wheels 14 is a tailpiece 15 from which a drag or depth stake 16 depends for penetration into the soil 17. The depth of drag stake penetration is desirably adjustable according to soil conditions and the desired type of cultivation. Accordingly, it is desirable that the depth stake 16 be vertically adjustable to control the depth of penetration of the drag stake.

In the embodiment of the invention shown in FIGS. 1, 2, and 3, the tailpiece 15 comprises laterally spaced side arms or leaves 20, which are interconnected along their corresponding top margins by a web 21. In practice, the tailpiece of this embodiment is made of a flat sheet of steel which is folded over along the web 21 to produce the parallel leaf structure aforesaid.

The web 21 is cut away or relieved to form a drag stake stop shoulder at 22. Laterally aligned pin receiving openings 23 are provided in portions 24 of the arms 20 which project rearwardly from the stop shoulder 22.

A U-shaped clip 28 has legs 25 welded to the arms 20 and the rearwardly extending portions 24 thereof and a bight portion 26 which spans across the space between the arm portions 24 around the rear ends thereof. Legs 25 are also provided with openings 27 which are laterally aligned with the openings 23 in the arm portions 24. The arms 20 and clip legs 25 are further provided on an axis offset longitudinally from the axis of the laterally aligned openings 23, 27 with another set of aligned openings 30, 31 (FIG. 3).

A J-shaped pin having a long leg 32 extending through the aligned set of openings 30, 31 and a short leg 33 normally extending through the aligned set of openings 23, 27 is provided to releasably lock the drag stake 16 in adjusted position. Long leg 32 has a shoulder washer 34 to receive the thrust of a coil spring 35 which is between the washer and a leg 25 of the clip 28. The spring 35 biases the short leg 33 of the J-shaped pin into full engagement with the set of openings 23, 27 and through one or another of the longitudinally spaced holes 36 in the drag stake 16.

Near its bight 37, the long arm 32 of the J-shaped pin is provided with a cotter pin 38 or the like to define by abutment with leg 25 of the clip 28, the fully engaged position of the J-shaped pin.

In operative position, stake 16 is embraced by the arm portions 24, thus to hold the drag stake adjustably with respect to the soil 17.

By manually depressing the long arm 32 of the J-shaped pin against the bias of spring 35, it can be retracted to its dotted line position shown in FIG. 2, thus to withdraw short arm 35 from engagement with one or another of the holes 36 in depth stake 16. This permits complete withdrawal of the depth stake or raising or lowering it to any selected position, as indicated in the dotted lines of FIG. 1. When the depth stake 16 has been properly adjusted, the J-shaped pin is released and its spring 35 will return its short arm 33 to full engagement with the openings 23, 27 and through that one of the holes 36 of the depth stake which is aligned therewith.

The depth stake is confined between the fore and aft stops 22, 26 against any substantial pivoting about the axis of the short leg 33 of the J-shaped pin. When the tiller is driving forwardly, stop shoulder 22 is effective to prevent collapse or pivotal movement of the stake. When the tiller is driving rearwardly, stop web 26 likewise prevents collapse or pivotal movement of the stake. Yet the stake is sufficiently free between the stops 22, 26 to permit vertical adjustment as aforesaid.

In the foregoing embodiment of the invention, the clip 28 reinforces the arms 20 and their rearward projections 24 to provide a rugged and wear-resistant bearing for the J-shaped pin 32, 33 and adapts the tailpiece to withstand the shocks and pressures to which depth stake 16 is subject.

FIGS. 4 and 5 disclose a modified embodiment of the tailpiece 41. In this embodiment, the tailpiece consists of laterally spaced arms 42 which are desirably of somewhat heavier gauge metal than the arms 20 of the tailpiece construction shown in FIGS. 1, 2 and 3. The gauge of the arms 42 is sufficient to provide an adequately strong bearing for the J-shaped pin 32, 33, 37, without need for reinforcement. Accordingly, the arms 42 are simply provided with two sets of laterally aligned openings 43, 44, through which the respective short leg 33 and long leg 32 of the J-shaped pin project. In this embodiment, there is no web, such as shown at 21 of the FIGS. 1 through 3 embodiment. Accordingly, to provide fore and aft stops for the drag stake 16, upper and lower stop lugs 45, 46 are welded between the arms 42 and span thereacross to prevent collapse of the drag stake in either forward or reverse movement of the tiller. The J-shaped pin 32, 33 of the embodiment of FIGS. 4 and 5 is manipulated in the same way as in the FIGS. 1 through 3 embodiment to provide quick adjustment of the drag stake 16.

In both disclosed embodiments of the invention the portions of the stops which abut the stake, and the pin, are triangularly related, thus to provide a firm support for the stake. The stops together with the pin also define a fixed upright axis on which the stake is disposed regardless of which of the holes in the stake the pin is received.

I claim:

1. The combination with a tiller having power means to move it selectively forwardly and in reverse, a tailpiece extending rearwardly from said tiller, a ground engaging drag stake depending from said tailpiece, said drag stake having a series of longitudinally spaced holes, said tailpiece having a pin receivable through one or another of said holes to mount the drag stake at selectively different depths, a spring biasing said pin toward hole engagement and subject to pressure against said bias to release said pin from hole engagement for depth adjustment, means for retaining the pin on the tailpiece notwithstanding release thereof from hole engagement, said tailpiece having stops which, together with the pin, define a triangular support for the stake and define a fixed upright axis on which the stake is disposed regardless of which of the holes in the stake is received, and against which the drag stake will selectively abut to prevent collapse of the drag stake regardless of whether the tiller is moving forwardly or rearwardly.

2. The device of claim 1 in which said tailpiece comprises laterally spaced arms embracing the drag stake, said arms having one set of holes laterally aligned with a hole in the drag stake and another set of laterally aligned holes longitudinally offset from the first set of holes, said pin being J-shaped and having a short leg aligned with said one set of holes, a long leg aligned with said other set of holes, and a spring coiled around said long leg and biasing the short leg into drag stake hole engagement.

3. The combination with a tiller having power means to move it selectively forwardly and in reverse, a tailpiece extending rearwardly from said tiller, a ground engaging drag stake depending from said tailpiece, said drag stake having a series of longitudinally spaced holes, said tailpiece having a pin receivable through one or another of said holes to mount the drag stake at selectively different depths, a spring biasing said pin toward hole engagement and subject to pressure against said bias to release said pin from hole engagement for depth adjustment, said tailpiece having stops against which the drag stake will selectively abut to prevent collapse of the drag stake regardless of whether the tiller is moving forwardly or rearwardly, said tailpiece comprising laterally spaced arms embracing the drag stake, said arms having one set of holes laterally aligned with a hole in the drag stake and another set of laterally aligned holes longitudinally offset from the first set of holes, said pin being J-shaped and having a short leg aligned with said one set of holes, a long leg aligned with said other set of holes, and a spring coiled around said long leg and biasing the short leg into drag stake hole engagement, said tailpiece further comprising a web interconnecting said arms along corresponding margins thereof and having an end portion exposed to the side of the drag stake to constitute one of said stops, and a U-shaped clip having legs fastened to the arms of the tailpiece and a bight spanning therebetween to constitute the other of said stops.

4. The combination with a tiller having power means to move it selectively forwardly and in reverse, a tailpiece extending rearwardly from said tiller, a ground engaging drag stake depending from said tailpiece, said drag stake having a series of longitudinally spaced holes, said tailpiece having a pin receivable through one or another of said holes to mount the drag stake at selectively different depths, a spring biasing said pin toward hole engagement and subject to pressure against said bias to release said pin from hole engagement for depth adjustment, means for retaining the pin on the tailpiece notwithstanding release thereof from the hole engagement, said tailpiece having stops which, together with the pin, define a triangular support for the stake and define a fixed upright axis on which the stake is disposed regardless of which of the holes in the stake the pin is received, and against which the drag stake will selectively abut to prevent collapse of the drag stake regardless of whether the tiller is moving forwardly or rearwardly, said tailpiece comprising laterally spaced arms embracing the drag stake, said arms having one set of holes laterally aligned with a hole in the drag stake and another set of laterally aligned holes longitudinally offset from the first set of holes, said pin being J-shaped and having a short leg aligned with said one set of holes, a long leg aligned with said other set of holes, and a spring coiled around said long leg and biasing the short leg into drag stake hole engagement, said tailpiece being provided between its said arms with cross lugs constituting said stops.

References Cited in the file of this patent

UNITED STATES PATENTS

| 2,827,842 | Peterson et al. | Mar. 25, 1958 |
| 2,903,077 | Kamlukin | Sept. 8, 1959 |
| 3,016,957 | Olson | Jan. 16, 1962 |